P. H. THOMAS.
ELECTRICAL DISTRIBUTION SYSTEM.
APPLICATION FILED MAY 6, 1903.

1,115,456.

Patented Oct. 27, 1914.

Witnesses:

Inventor
Percy H. Thomas.
by Charles A. Terry Atty

UNITED STATES PATENT OFFICE.

PERCY H. THOMAS, OF PITTSBURGH, PENNSYLVANIA, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRICAL DISTRIBUTION SYSTEM.

1,115,456.      Specification of Letters Patent.      Patented Oct. 27, 1914.

Original application filed March 5, 1903, Serial No. 146,282. Divided and this application filed May 6, 1903. Serial No. 155,927.

*To all whom it may concern:*

Be it known that I, PERCY H. THOMAS, a citizen of the United States, and resident of Pittsburgh, county of Allegheny, State of Pennsylvania, have invented certain new and useful Improvements in Electrical Distribution Systems, of which the following is a specification.

The present invention makes use of the qualities of the vapor converter combined with one or more magnets for regulating the current in a portion of a system supplied from a source of alternating or pulsating currents.

The manner in which this object is accomplished will be understood by reference to the accompanying drawings, in which—

Figure 1:
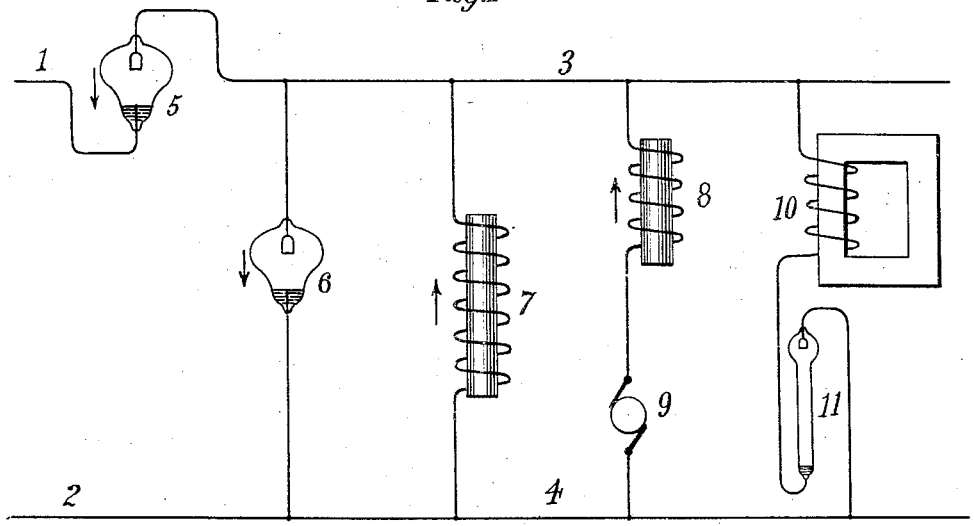
Figure 2:
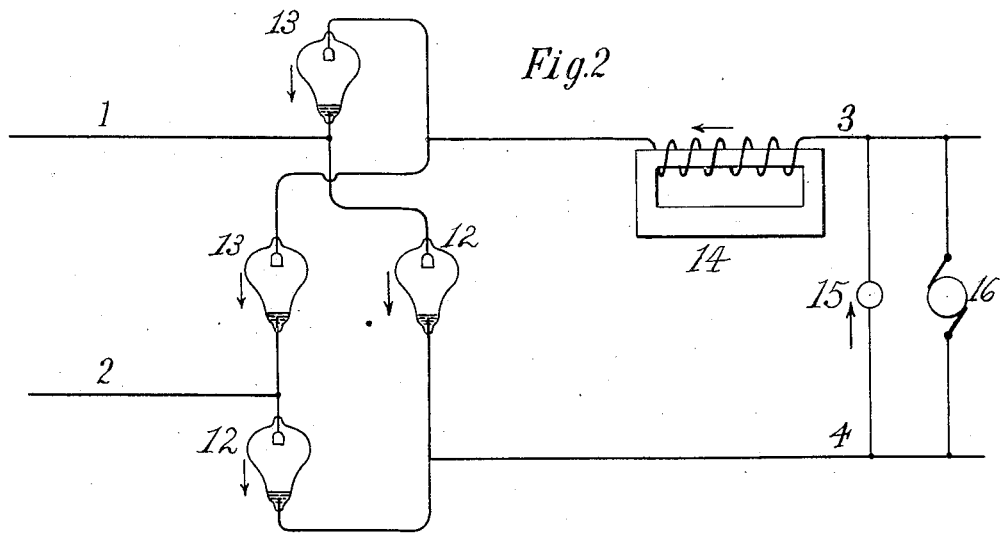

Figures 1 and 2, are diagrams of different organizations of electric circuits to which my invention may be applied.

In the drawings, 1 and 2 represent the mains of an alternating current supply system connected with a source of single phase alternating current. The invention readily admits of being applied to alternating current supply systems of any number of phases, but for simplicity I have illustrated it in connection with a single phase system of supply.

The main conductors of the receiving circuit are shown at 3 and 4, and between the supply mains and the receiving mains I interpose a vapor converter, 5, which permits current to flow in the direction indicated by the arrow and practically prevents the flow of current in the opposite direction.

In shunt across the supply mains, I place a similar converter, 6. The direction of flow is indicated by the arrow in this instance also.

Between the receiving mains, I have illustrated several shunt circuits one of which includes a magnet, 7, another includes a magnet, 8, and a motor, 9, while a third includes a magnet, 10, and a Cooper Hewitt lamp 11. It will be understood that other translating devices besides the motor 9 or the lamp 11, may be included in these shunts, and that still other shunt circuits may be added to those appearing in the illustration. In connection with the receiving circuit, however, one or more electro-magnets should be employed, for reasons which will presently appear. For example, it is known that when the circuit of an electro-magnet is interrupted, the energy stored in the coils of the magnet tends to discharge itself in the same direction as that of the original flow. Thus, under the conditions illustrated in Fig. 1, the various translating devices in the receiving circuit are assumed to be so adjusted with relation to the conditions of supply that when a current of high potential is supplied by the feeding circuit, the several translating devices will be operated for whatever purposes may be found desirable. This statement applies to the magnets 7, 8 and 10, as well as to the other translating devices 9 and 11.

During the operation of the translating devices currents of a single direction will pass through the receiving circuit returning by way of the vapor converter 5. Should the voltage of the supply circuit momentarily fall below a predetermined amount, the receiving circuit would under ordinary conditions be temporarily deprived of adequate current supply.

The tendency of the magnets 7, 8 and 10, however, is to compensate for the momentary drop in the supply circuit by sending energy in the original direction through the receiving mains 3 and 4, by way of the converter 6. The action of the magnet 7 would simply be such as to supply an easy means of self-discharge, while the action of the magnets 8 and 10, would contribute to maintaining energy in the translating devices 9 and 11, respectively, until the supply circuit is again in condition to deliver the requisite voltage for operating the translating devices in the receiving circuit.

Referring to Fig. 2, the conditions here illustrated are essentially the same as those shown in Fig. 1, except that one of the receiving mains is connected to each supply main through a converter which transmits energy in one direction, and the other receiving main is connected to each supply main through a converter transmitting energy in the opposite direction. These converters may be called positive devices when the direction of flow is from the supply circuit to the receiving circuit, and negative devices when the opposite condition exists. In Fig. 2, positive devices are shown at 12, 12, and negative devices at 13, 13.

The magnet which is utilized for steadying the operation in this system is illustrated at 14, and is included in one of the receiving circuit mains, as 3. Various translating devices appear at 15 and 16. These may be, respectively, a lamp and a motor, or they may be any other suitable translating devices.

In the system of Fig. 2 both waves of the alternating current are utilized, but the flow of current in the receiving circuit is always in the same direction.

On a momentary fall of potential in the supply circuit such as would cause a cessation of flow through the converters, the inadequate potential of the supply circuit will be temporarily reinforced by the discharged energy from the magnet 14, thus creating, under the proper conditions, a flow through a local circuit including the several converters and the translating devices in the receiving circuit.

In both systems the expenditure of energy in maintaining the flow past a momentary drop of potential is very slight, consisting in utilizing the energy stored up in the magnet coils during the previous operation of the system.

In the absence of the converter system illustrated herein, the magnet or magnets would tend to produce the same effect as herein described, but such tendency would be absorbed by the generator without creating such conditions as would steady the operation of the distributing system.

It will be understood that the inductance of the consumption circuit itself, taken in connection with the described arrangement of vapor converters, may be sufficient to steady the operation of the system without the employment of special magnets for that purpose.

It will also be understood that the system herein claimed is intended to cover all the uses to which it is applicable whether for steadying the operation of a distribution system as described or for such other purposes as that.

This application is a division of my application filed March 5, 1903, Serial Number 146,282.

I claim as my invention:

1. The combination with an electric receiving circuit traversed by a pulsating current, of means located in said circuit for storing energy magnetically at periods of increasing current, a shunt connection across said circuit adapted to carry the discharge of energy only at periods of decreasing current, the said shunt connection containing a vapor converter which permits a flow of current in one direction only.

2. The combination with a suitable alternating supply, means for producing direct current from said supply, and receiving mains therefor, of a translating device, a shunt connection across said direct current mains around said translating device, the circuit of said translating device containing an inductance and the said shunt connection containing a device which permits a flow of current in one direction only, whereby the inductance of the circuit containing the translating device causes a discharge of accumulated energy mainly through the shunt connection.

3. In a system of electrical distribution, an alternating supply circuit, a receiving circuit, and a rectifier between said circuits, and a circuit across said receiving circuit, a vapor device having the characteristic of permitting a flow of current in one direction only in said cross circuit, and means for storing and discharging energy in the receiving circuit during the normal operation of the system, whereby energy stored in said mains is discharged mainly through said cross circuit and through at least a part of the receiving circuit.

4. In a system of electrical distribution, a supply circuit, a receiving circuit, means for storing and discharging energy in the receiving circuit during the normal operation of the system, and a shunt connection containing a single vapor rectifier, said rectifier including an exhausted container and electrodes, one of which is vaporizable, therein, whereby energy stored in said storing means will, upon a fall of potential in the supply circuit, be discharged through a portion of said receiving circuit.

5. In a system of electrical distribution, the combination with an alternating supply and direct current mains, of a vapor rectifier comprising an exhausted container, and electrodes therein, one of which is a vaporizable re-constructing cathode, said rectifier being traversed by the current between said supply and said mains, in combination with a plurality of receiving devices, an inductance in series with each receiving device, and a connection across said receiving mains having the property of permitting the flow of current in one direction only.

6. The combination with a single phase alternating source and a pair of direct current receiving mains supplying translating devices and an inductance device in the circuits of said devices, of a mercury vapor rectifier connected between said source and said mains in combination with a receiving device connected across said direct current mains having the property of passing current in one direction only, whereby the flow of current in the translating devices is steadied.

7. In a system of electrical distribution in combination with a single phase source, a mercury vapor rectifier for rectifying currents from said source and direct current receiving mains for said rectified current, of a plurality of direct current devices connected across said mains, some of said devices having inductance and at least one of said devices being a mercury vapor rectifier having the property of passing current in one direction only.

Signed at New York, in the county of New York and State of New York, this 28th day of April, A. D. 1903.

PERCY H. THOMAS.

Witnesses:
WM. H. CAPEL,
GEORGE H. STOCKBRIDGE.